(12) United States Patent
Bosboom et al.

(10) Patent No.: US 12,728,631 B2
(45) **Date of Patent: *Sep. 8, 2026**

(54) APPARATUS, SYSTEM AND METHOD FOR A LAMINATION PRESS

(71) Applicant: JABIL INC., St. Petersburg, FL (US)

(72) Inventors: Jeroen Bosboom, St. Petersburg, FL (US); Michael McKenney, St. Petersburg, FL (US); George Kovatchev, St. Petersburg, FL (US)

(73) Assignee: JABIL INC.

( * ) Notice: Subject to any disclaimer, the term of this patent is extended or adjusted under 35 U.S.C. 154(b) by 87 days.

This patent is subject to a terminal disclaimer.

(21) Appl. No.: 18/779,139

(22) Filed: Jul. 22, 2024

(65) Prior Publication Data

US 2025/0001747 A1 Jan. 2, 2025

Related U.S. Application Data

(63) Continuation of application No. 18/208,810, filed on Jun. 12, 2023, now Pat. No. 12,070,928, which is a (Continued)

(51) Int. Cl.
*B32B 41/00* (2006.01)
*B32B 37/00* (2006.01)
*B32B 37/10* (2006.01)

(52) U.S. Cl.
CPC ...... *B32B 37/0046* (2013.01); *B32B 37/1018* (2013.01); *B32B 41/00* (2013.01)

(58) Field of Classification Search
CPC . B32B 37/0046; B32B 37/1018; B32B 41/00; B32B 37/003; B32B 2309/68; B32B 38/1841; B32B 37/10; B30B 15/062

(Continued)

(56) References Cited

U.S. PATENT DOCUMENTS 11,673,382 B2 6/2023 Bosboom
12,070,928 B2 * 8/2024 Bosboom ............ B32B 38/1841

(Continued)

FOREIGN PATENT DOCUMENTS

CN 101556933 10/2009
CN 107383244 A 11/2017

(Continued)

OTHER PUBLICATIONS

Extended European Search Report issued in App. No. EP23218187, dated Apr. 15, 2024, 6 pages.

(Continued)

*Primary Examiner* — Michael N Orlando
*Assistant Examiner* — Joshel Rivera
(74) *Attorney, Agent, or Firm* — Riverside Law LLP

(57) ABSTRACT

A lamination apparatus, system, and method. The apparatus, system and method are for a lamination press for laminating at least one laminating film to a subject, which may include: an upper press comprising a gel plate, an upper vacuum chamber, and tooling suitable to apply the laminating film; a lower press suitable to maintain the subject to receive the laminating film, and comprising a lower vacuum chamber, an air bearing stage, and servo-positioned tooling; and an aligner that applies the servo-positioned tooling to maintain positional balance and alignment of the subject by the air bearing stage during the laminating while enabling vertical flexure of the lower press, wherein the positional balance and alignment is substantially continuously monitored by a controller.

20 Claims, 9 Drawing Sheets

Related U.S. Application Data continuation of application No. 17/299,997, filed as application No. PCT/US2019/064541 on Dec. 4, 2019, now Pat. No. 11,673,382.

(60) Provisional application No. 62/775,010, filed on Dec. 4, 2018.

(58) Field of Classification Search
USPC .................... 156/60, 64, 350, 351, 378, 379
See application file for complete search history.

(56) References Cited

U.S. PATENT DOCUMENTS

| | | | |
|---|---|---|---|
| 2006/0251826 | A1 | 11/2006 | Pfeifer |
| 2010/0266373 | A1 | 10/2010 | George |
| 2013/0000816 | A1 | 1/2013 | Van Den Brand |
| 2013/0012643 | A1 | 1/2013 | Monsheimer |
| 2013/0037204 | A1 | 2/2013 | Kurimura |
| 2015/0253580 | A1 | 9/2015 | Asakura |
| 2017/0008233 | A1 | 1/2017 | Vontorcik, Jr. |
| 2017/0028475 | A1 | 2/2017 | Heikkila |
| 2017/0217809 | A1 | 8/2017 | Laurence |
| 2018/0319708 | A1 | 11/2018 | Haque |
| 2018/0345576 | A1 | 12/2018 | Constantinou |

FOREIGN PATENT DOCUMENTS

| | | | |
|---|---|---|---|
| JP | 2017149086 | A | 8/2017 |
| WO | 2010019982 | A1 | 2/2010 |
| WO | 2010019983 | A1 | 2/2010 |
| WO | 2013040319 | A1 | 3/2013 |
| WO | 2017217809 | A1 | 12/2017 |

OTHER PUBLICATIONS

International Search Report for PCT/US2019/065035, dated Apr. 21, 2020.

Office Action (Non-Final Rejection) dated Jan. 8, 2024 for U.S. Appl. No. 18/208,810 (pp. 1-9).

Office Action (Notice of Allowance and Fees Due (PTOL-85)) dated Apr. 23, 2024 for U.S. Appl. No. 18/208,810 (pp. 1-8).

Office Action (Notice of Allowance and Fees Due (PTOL-85)) dated May 9, 2024 for U.S. Appl. No. 18/208,810 (pp. 1-2).

Written Opinion of the International Searching Authority for PCT/US2019/065035, dated Apr. 21, 2020.

Chinese Office Action (including English translation) issued in App. No. CN202311088661, dated May 24, 2025, 15 pages.

European Patent Office Communication pursuant to Article 94(3) issued in App. No. EP23218187 dated Feb. 11, 2025, 6 pages.

* cited by examiner

APPARATUS, SYSTEM AND METHOD FOR A LAMINATION PRESS

CROSS-REFERENCE TO RELATED APPLICATIONS

The present application is a continuation of U.S. application Ser. No. 18/208,810, filed Jun. 12, 2023, which is a continuation of U.S. application Ser. No. 17/299,997, filed Jun. 4, 2021, which claims benefit of priority to International Application No. PCT/US2019/064541, filed Dec. 4, 2019, which claims priority to U.S. Provisional Application No. 62/775,010, filed Dec. 4, 2018, each of which is incorporated herein by reference as if set forth in its entirety.

BACKGROUND

Field of the Disclosure

The present disclosure relates to lamination, and, more specifically, to an apparatus, system and method for a lamination press.

Description of the Background

Lamination is the technique of manufacturing a material in multiple layers, so that the composite material achieves improved strength, stability, sound insulation, appearance or other advantageous properties from the use of the differing materials in multiple layers. A laminate is a permanently assembled product achieved using heat, pressure, vacuum, welding, or adhesives to perform the lamination.

Different lamination processes may thus be employed, depending on the type of materials to be laminated. The materials used in laminates can be the same or different, depending on the processes and the object to be laminated. An example of the type of laminate using different materials would be the application of a layer of laminating film on one or both sides of a sheet of glass (the “laminated subject”).

For example, a lamination press, as the name implies, may use pressure or a vacuum (and may use other laminating techniques) to perform lamination. Because the lamination of a laminate onto a laminated subject using pressure/vacuum requires substantial pressure/vacuum and high precision, it is generally the case that such a lamination press requires substantial electromechanical equipment to maintain level while applying the laminating film onto the laminated subject. As such, lamination presses are typically quite large, highly complex, and very expensive.

SUMMARY

A lamination apparatus, system, and method are disclosed. The apparatus, system and method are for a lamination press for laminating at least one laminating film to a subject, which may include: an upper press comprising a gel plate, an upper vacuum chamber, and tooling suitable to apply the laminating film; a lower press suitable to maintain the subject to receive the laminating film, and comprising a lower vacuum chamber, an air bearing stage, and servo-positioned tooling; and an aligner that applies the servo-positioned tooling to maintain positional balance and alignment of the subject by the air bearing stage during the laminating while enabling vertical flexure of the lower press, wherein the positional balance and alignment is substantially continuously monitored by a controller.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
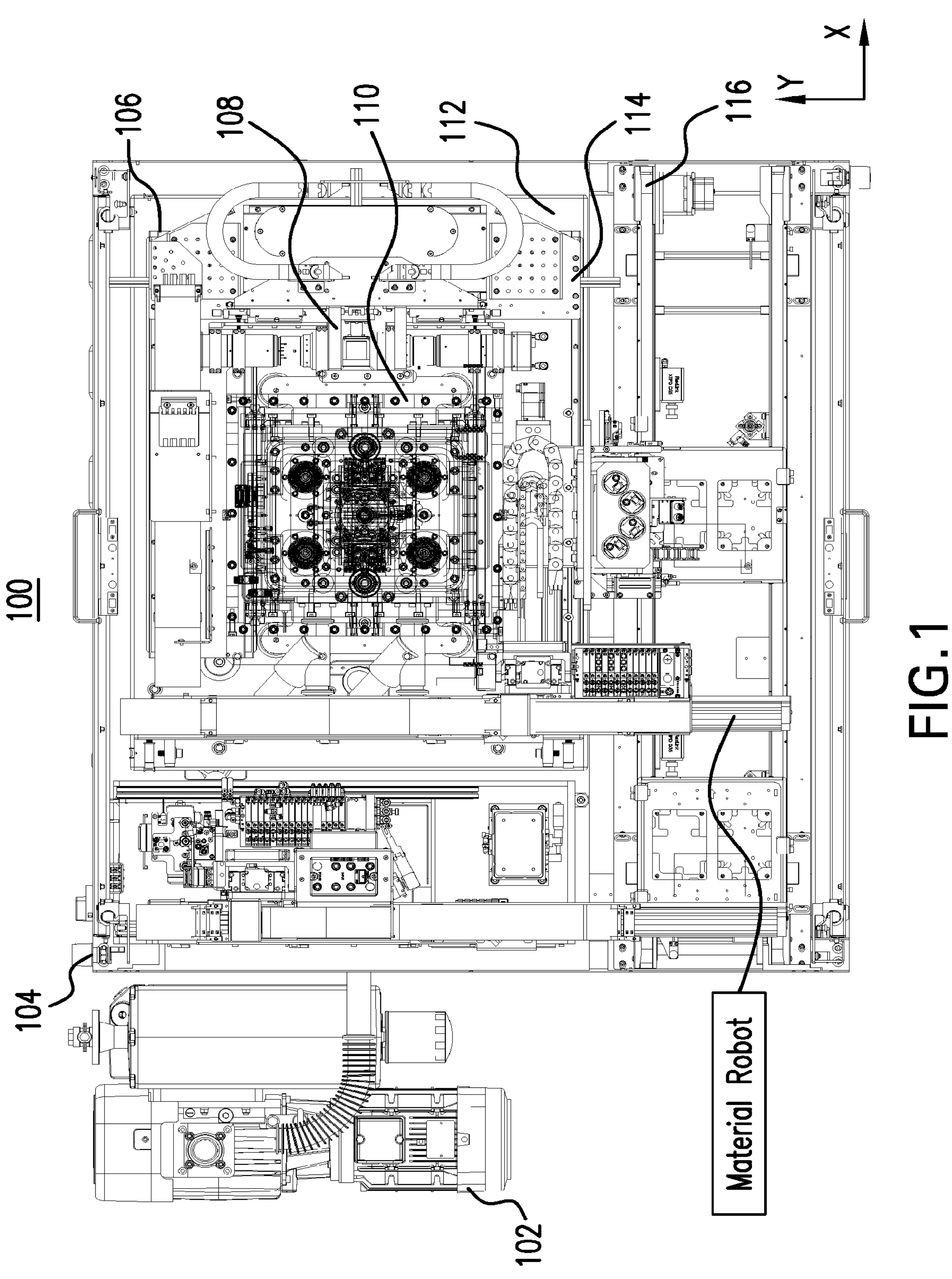
FIG. 1 is an illustration of aspects of a lamination press.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms “a”, “an” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

Embodiments are directed to and include a lamination press, and, more particularly, particularly advantageous aspects for the lower press portion of a lamination press. The embodiments may be used to laminate a plurality of surfaces, such as five surfaces or more, associated with a lamination "train track" path.

A "train track" is herein used to refer to a family of curves embedded on a surface, wherein the curves meet at a finite set of vertices referred to as "switches", and wherein, away from the switches, the curves are smooth and do not touch one another. As lamination of surfaces necessitates the partitions of closed subsets of the surfaces into unions of smooth curves, the lamination mapping of such surfaces is referenced throughout as train track paths, and the junction vertices of those paths are referred to as switches.

The embodiments provide the aforementioned train track path for multiple lamination surfaces in an at least substantially precise and bubble free lamination. This is accomplished, in part, because the embodiments advantageously provide an accommodation for vertical flexure, such as using an X-Y-theta plate, to provide torsional stiffness to the lower lamination press, but compliance of the lower lamination press with respect to pitch and roll.

As used herein, torsional stiffness is the torque per radian of twist for a surface. Torsional rigidity is the resistance to such a torsional, twisting deformation. Compliance in roll is defined as a rotation about solely a particular axis, and compliance in pitch includes a vertical compliance of outer side edges.

The accommodation for vertical flexure of the lower press provided in the embodiments improves the ability to laminate hard to hard, soft to hard, bent to bent, and like combinations of surfaces. Thereby, the embodiments may improve the ability to perform wet, dry, wax, solvent-based, solventless, and other types of lamination in relation to any receptive surface type or shape, or combination of surface types or shapes.

Moreover, the vertical accommodation provided in the embodiments allows for substantial improvements over the bulky designs of laminating presses in the known art. By way of example, because precision electromechanical control of theta-axis motion is unnecessary in the lower press in the embodiments, the entirety of the laminating press provided in the embodiments is smaller, less expensive, and suitable for faster laminating operation than is the known art.

Accordingly, significant advantages are made available through the use of the disclosed embodiments. For example, what was a "floor to ceiling" laminating press in the known art may now comprise a "desktop" laminator. Needless to say, such a substantial decrease in size from the known art, and the consequent minimization of mechanical complexity of the embodiments as compared to the known art, may substantially lower the cost of a laminating press in the disclosed embodiments, such as to a cost level of 1/10 or less of the cost of laminating presses in the known art.

To accomplish the foregoing, and to thereby improve lamination quality while decreasing press size and complexity, the planarity of the upper and lower press plates is critical. Accordingly, a servo-driven lower press includes X-Y-theta tooling to allow for optimal alignment of the upper and lower lamination plates. More particularly, upon loading of the upper and lower vacuum press plates, a vision system may compare alignment points between the upper and lower plates and the lamination product. The servo-driven lower press tooling may then compensate for misalignments based on the visual inspection prior to the bonding cycle.

Yet more specifically, the vacuum chamber of the lower press may be fixed in three dimensions, while the internal tooling within the chamber is supported on an air bearing stage in the disclosed embodiments. The air bearing stage may be coupled with the aforementioned servo-driven X-Y-theta stage mounted below the stationary vacuum chamber, such as using a diaphragm flexure plate as disclosed herein below. Such a diaphragm flexure plate may act as a universal joint with a movable Z axis, tip, and tilt, along with providing zero lash or motion loss.

Thereby, the press load may be transmitted from the fixed upper tooling plate to the servo-driven lower tooling plate via the air bearing stage. That is, the air bearing stage may straddle the aforementioned X-Y-theta servo drive mechanism, and the lower vacuum chamber may, in turn, straddle the air bearing stage. The lower plate tooling may thus be connected to the X-Y-theta alignment stage by the free floating air bearing stage to which both are connectively straddled. As such, using isolation of the X-Y-theta alignment stage from the press load, and by keeping the foregoing outside the vacuum chamber, the complexity and cost of the servo driven stages in the embodiments are substantially reduced, as referenced above.

FIG. 1 illustrates a top view of an exemplary lamination cell 100. The illustrated embodiment may include a vacuum pump 102, a flexible substrate bonder 104, one or more vision robots 106, one or more moving cameras 108, a vacuum and press chamber 110, a base surface 112 to provide substantially level press planarity, such as a granite base, one or more fixed cameras 114, and a process conveyor 116 to move laminated subject/laminated product into and/or out of the lamination cell press 100.

Figure 2:
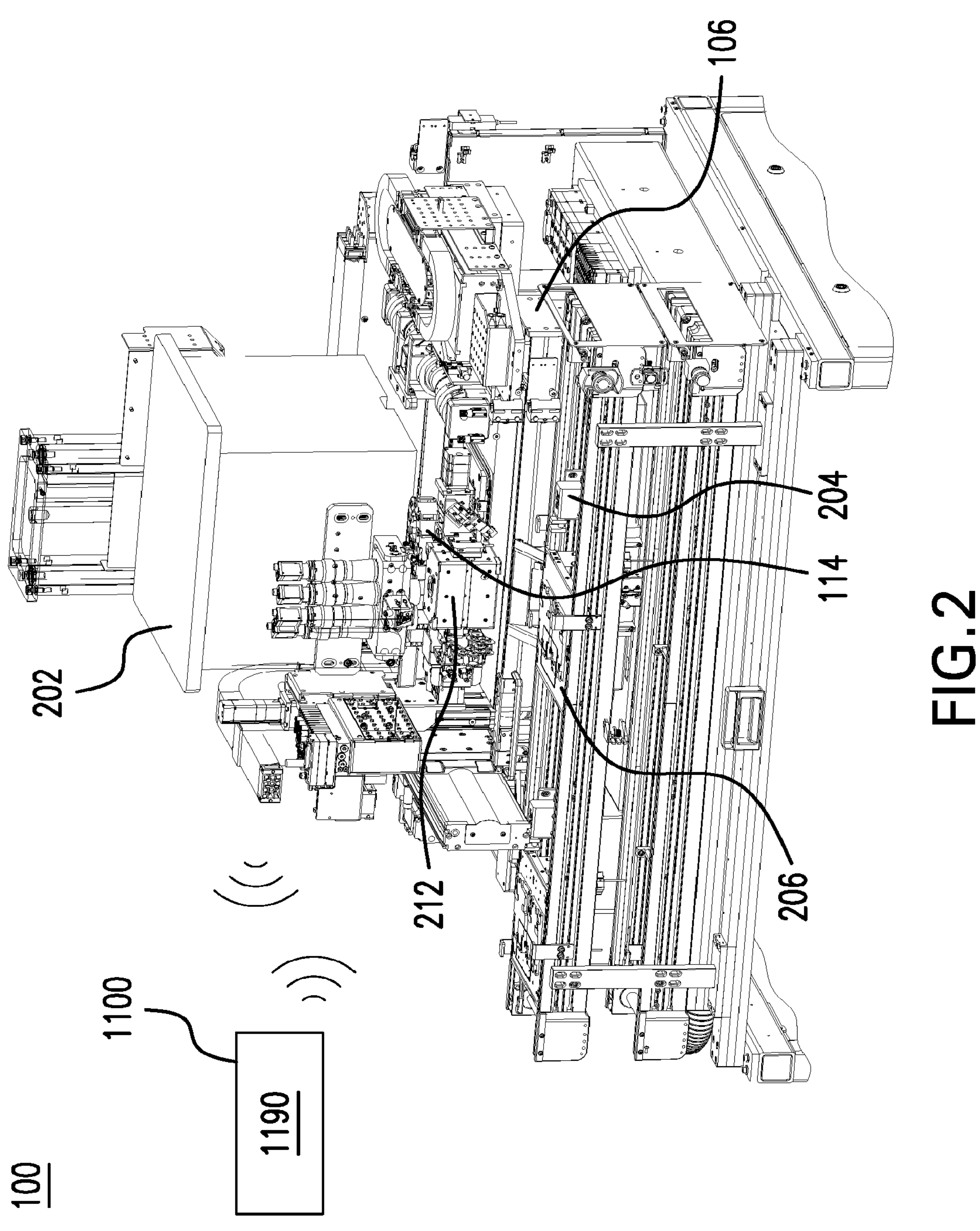
FIG. 2 an isometric view of a lamination cell according to the embodiments.

FIG. 2 illustrates an isometric view of a lamination cell 100 according to the embodiments. The illustration of FIG. 2 again includes upper press tooling 202, lower press tooling 204, one or more fixed down cameras 114, a vision robot 106, and additional features known to the skilled artisan. In the illustration of FIG. 2, a conveyed pallet 206 stops at an aligner position 208. A laminate/subject may be picked from the pallet 206, and may be rotated by a substrate wrist 212 as and if needed.

Identifying information for the gel plate 210 and/or the laminating film/subject may be read or captured and forwarded to control system 1100 for use in lamination control algorithms 1190, and such identifying information may be included in or include images, such as may be taken by the down cameras 114 or vision robots 106. Gel plate 210/laminating film may be placed onto the upper press tooling 202 in accordance with the identifying information, and the lamination subject may be placed into the lower press tooling 204.

The lower press tooling aligner, as discussed further herein below, may then move the laminated subject to a corrected position with respect to planar, angular and three-dimensional position, as discussed throughout. Such a corrected position may be indicated by, for example, images, captured by the vision robot 106, of, among other aspects, the gel plate 210 and/or the lamination subject, as referenced above.

Figure 3:
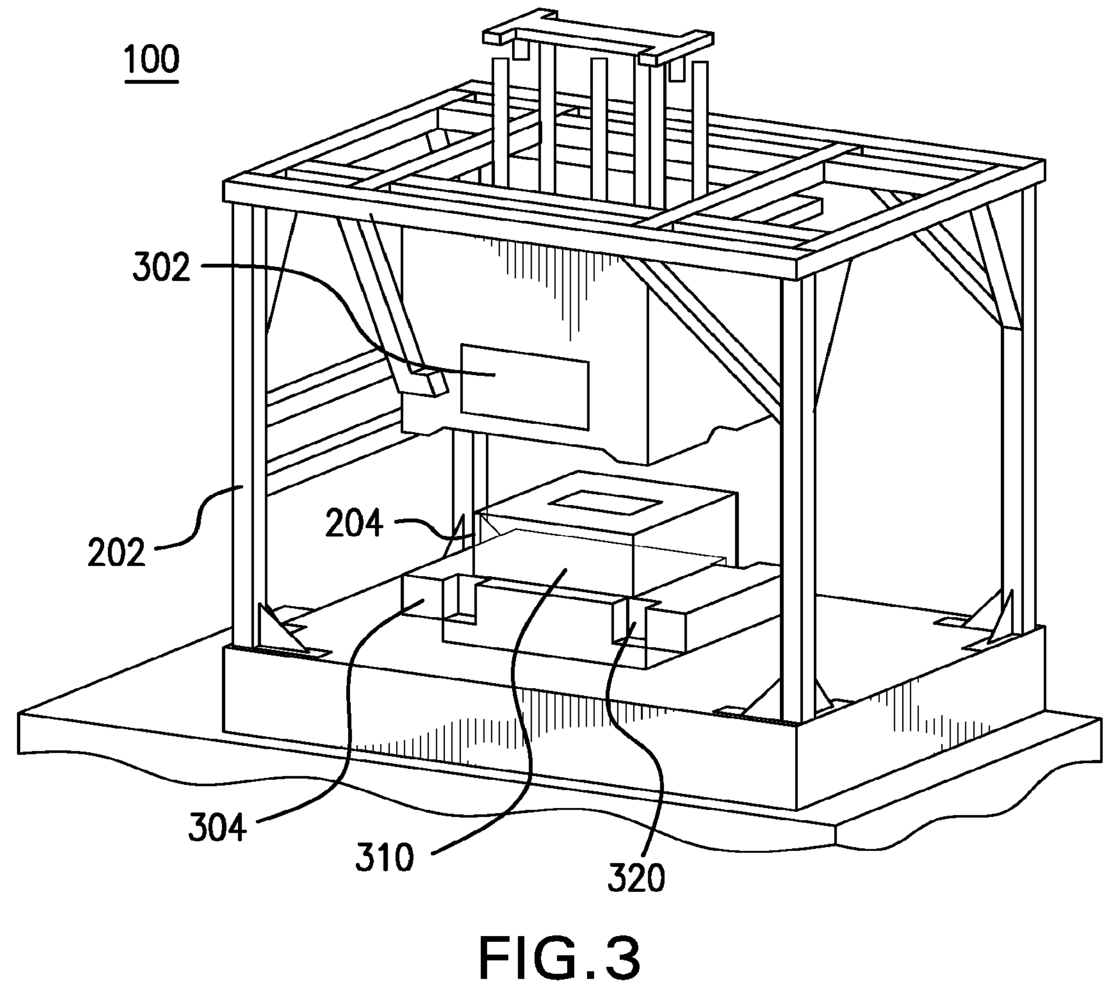
FIG. 3 illustrates an isometric view of a lamination press in accordance with the embodiments.

FIG. 3 illustrates an isometric view of a press 100 in accordance with the embodiments. The illustration includes top and lower vacuum chambers 302, 304, as well as top and lower press tooling 202, 204. The top vacuum chamber 302 may move downward in order to seal, and the vacuum pump 102 discussed throughout may evacuate the press area. Upon alignment, the top press tooling 202 may press the gel plate 210 to the lamination subject 310 until a target force is achieved, following the realignment discussed throughout. Once the target force and time are achieved, the top press tooling 202 may release, and the vacuum 102 may release, allowing the top vacuum chamber 302 to move upward in order to open. The complete assembled product may then be picked from the aligner and placed back onto a pallet to depart the lamination press 100. Of note, the aligner 320 illustrated in FIG. 3 may include the air bearing stage discussed throughout, and/or may adjust the air bearing stage within the lower press.

Figure 4:
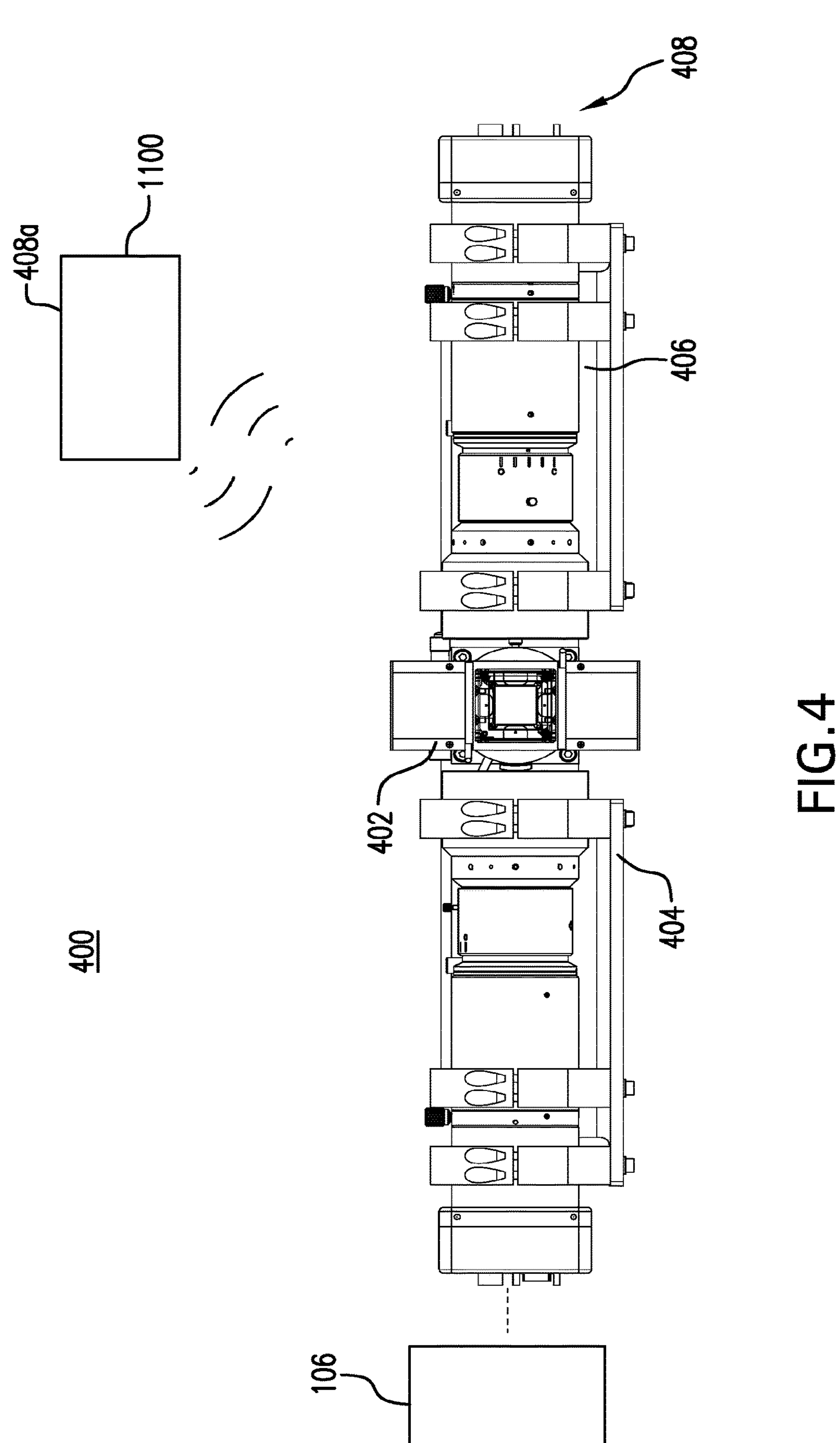
FIG. 4 illustrates an exemplary vision system.

FIG. 4 illustrates an exemplary vision system 400 that may be used in the embodiments. As shown, the vision system 400 may be and/or include the vision robot 106 referenced above, and may include, within its field of view, the upper and lower aspects discussed throughout. Further included in the vision system 400 may be one or more lights 402, prisms 404, lenses 406, and cameras 408, such as will be apparent to the skilled artisan, in order to allow the vision system 400 to perform the functionality discussed throughout. Moreover and as will be understood in light of the discussion herein, the vision system 400/robot 106 may be subjected to a camera driving control system 408*a*, which may be part of master control system 1100, that moves the camera(s) 408/system 400 to a plurality of positions in press 100 as necessary in order to gain vision suitable to allow for the alignment and lamination as discussed herein. Further, the disclosed vision system/robot 400/106 may move from and to a safe zone and out of the work area during lamination processes, by way of non-limiting example.

Figure 5:
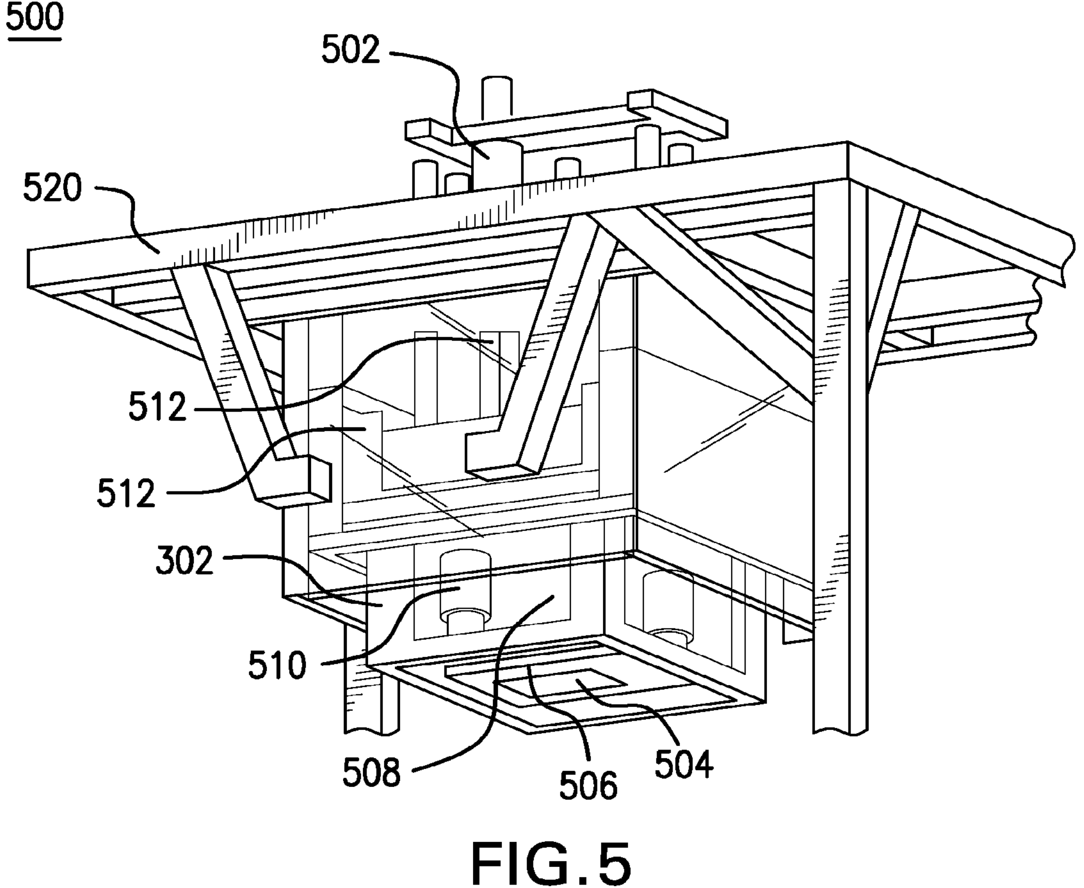
FIG. 5 is an isometric view illustrating aspects of an upper press.

FIG. 5 is an isometric view illustrating with particularity aspects of an exemplary upper press 500. The upper press 500 may include, for example, counterbalance springs 502, a vacuum chuck 504, edge grip cylinders 506, press cylinders 508, press bearings 510, an upper vacuum chamber 302, and vacuum chamber bearings and cylinders 512, all mounted within an upper press frame 520. Aspects of upper press 500 may be included in upper press tooling 202, discussed herein above.

More specifically, a gel plate may be placed onto the vacuum chuck 504, and the edge grip cylinders 506 may hold the gel plate 210. The counterbalance springs 502 may support the weight of the totality of the upper tooling, such as in case of a sudden pressure loss. The disclosed upper press 500 may perform the bonding of the assembled product using pressure applied by the press cylinders 508.

Figure 6:
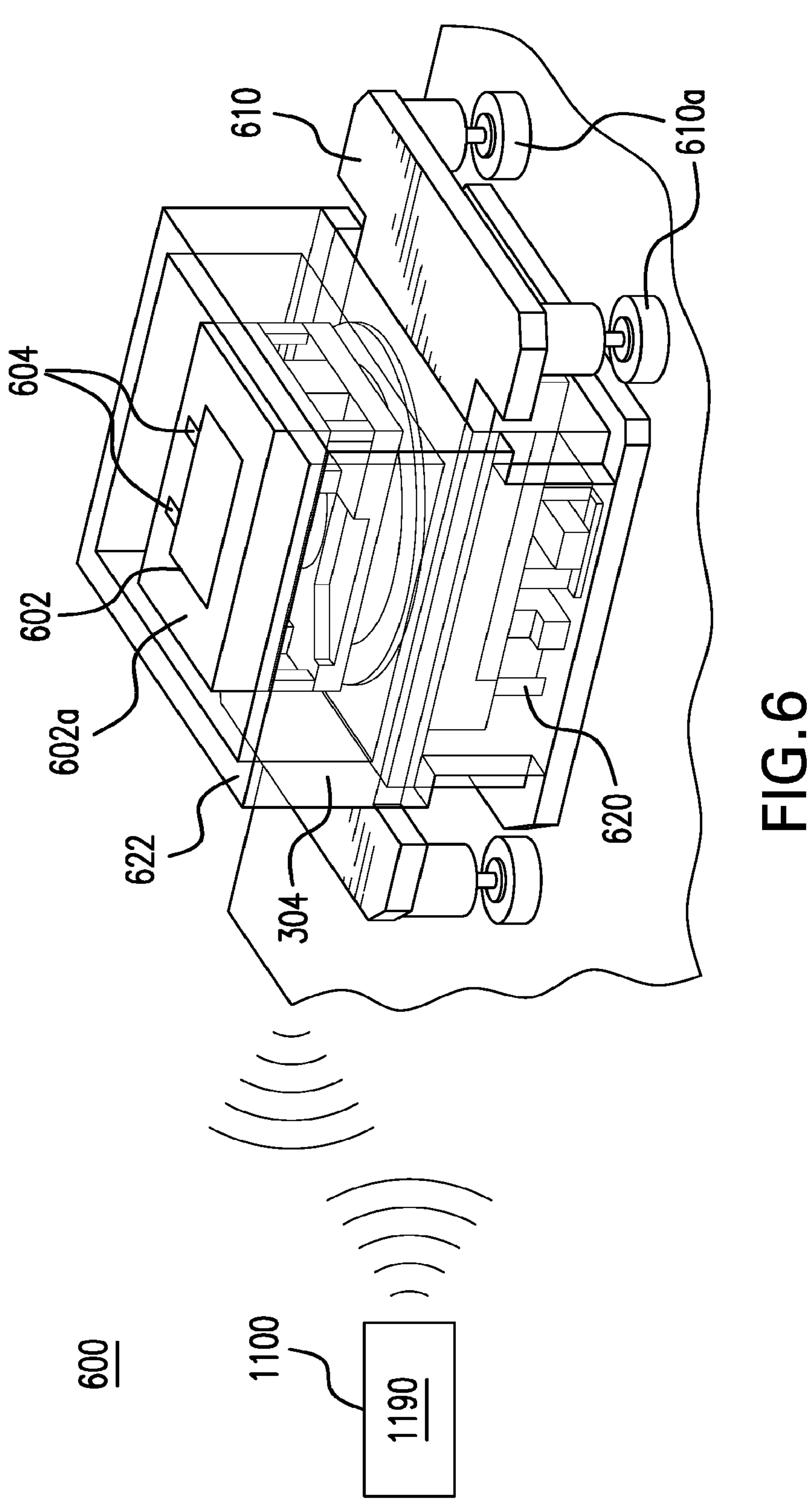
FIG. 6 is an isometric view illustrating aspects of a lower press.

FIG. 6 is an isometric view illustrating an exemplary embodiment of a lower press 600 according to the disclosure. The lower press 600 may include a vacuum chuck 602 having servo-positioned tooling 602*a* as discussed herein. Further included may be one or more grip cylinders 604, and an air bearing stage 610 having a plurality of air bearings 610*a*, such as may be cornered at four outer corners of the air bearing stage 610. Although the air bearing stage 610 may include four air bearings, it will be appreciated by the skilled artisan that fewer or additional air bearings may be included without departing from the disclosure. Also included may be an aligner robot 620, as discussed throughout and suitable to align the air bearing stage 610; a lower vacuum chamber 304; and one or more heating elements 622, such as may aid in the lamination process.

The air bearings 610*a* may, by way of non-limiting example, "fly" at 30-40 microns unloaded, which may decrease to, for example, 5 microns fully loaded. This compliance (which may comprise, for example, 25-35 microns) may be used as a planarity alignment methodology between the press plates.

Further, the servo/servo-tooling 602*a* may be subjected to one or more servo regulators (not shown), which may enable configuration of the "fly" height of the air bearings 610*a* during the press cycle. The foregoing may increase the pitch and roll angle for the lower press platen, or may allow for additional air bearings (not shown) to be brought on-line only as the press closes, by way of example.

Accordingly, the product may be placed onto the vacuum chuck 602 and gripped by the gripping cylinders 604. The press loading may be decoupled in the embodiments, thereby allowing for use of the aligner robot 620 to align the air bearings 610*a* in a simple, low-profile alignment system. This alignment system may be subject to the X-Y-theta control discussed throughout, such as may form part of a master controller system 1100, such as may be in communication with the vision control system 400 discussed above.

Figure 7A:
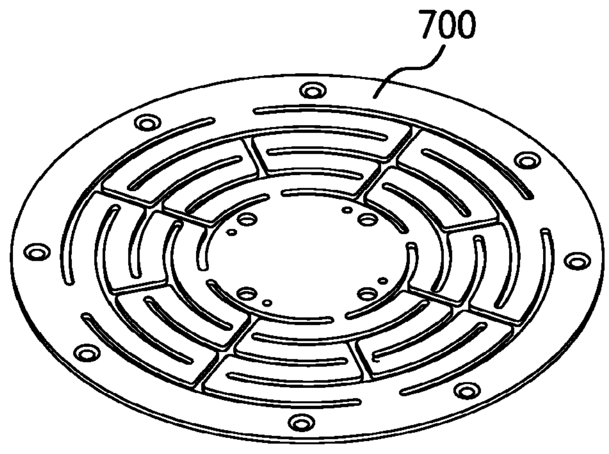
FIGS. 7A-7B illustrate the use of a diaphragm flexure plate.
Figure 7B:
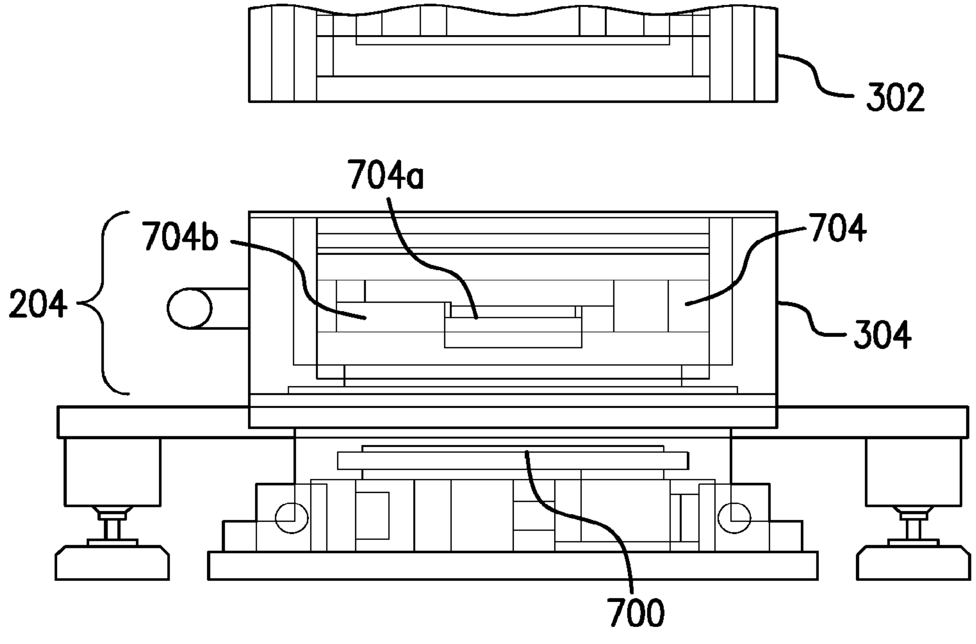

FIGS. 7A and 7B illustrate the use of a diaphragm flexure plate 700 to allow for the planarity adjustments discussed throughout, as is referenced herein above. As shown, an aspect of the flexure plate 700 may be located between the lower vacuum chamber 304 and the lower press tooling 204. The flexure plate 700 may allow for only limited motion in gaining planarity of the product on the lower press. By way of non-limiting example, the flexure plate 700 may allow for motion only in the Z axis and in the roll rotation.

To further ensure proper limitations on available motion in the planarity adjustments, the embodiments may include a spherical lock 704*a*, as illustrated in FIG. 7B. The spherical lock 704*a* may serve to prevent rotation of the tooling in a given axis, such as in the Z axis. The lock may additionally include any required bearings 704, cylinders 704*b*, and the like.

This lockable spherical joint **704*a* may be suitable to enhance alignment of the lamination press plates. More particularly, the locking joint 704*a* may be free to perform certain motions, but not others, such as providing freedom in pitch and roll, but fixation in yaw. The lock 704*a* may, for example, be releasable during the press cycle, such as to allow for an alignment once contact and adhesion occur, such as to compensate for otherwise uneven press loads. This spherical lock 704*a*, such as in conjunction with the flexure diaphragm plate 700**, discussed herein, may provide a Z axis joint for planarity adjustments in the embodiments.

In the foregoing discussion, suitable hardware known to the skilled artisan may be used to accomplish the embodiments. For example, the aligner robot 620 may include three orthogonal servo motors, such as Yaskawa® servo motors, wherein the servo motors may include rotary encoders, such as to allow for automated assessment of motor position and performance, such as by the controller system discussed throughout.

Further, it will be appreciated that the vacuum chambers provided in the embodiments may require seals to maintain vacuum. By way of example, a seal may be placed at the bottom of the disclosed air bearing stage 610, and accordingly, the stage may ride on this sealing surface. Flexibility in the seal allows for maintenance of the seal under the roll and pitch adjustments that may occur to the lower press pursuant to actuation of the air bearing stage by the aligner robot, as discussed throughout.

Figure 8:
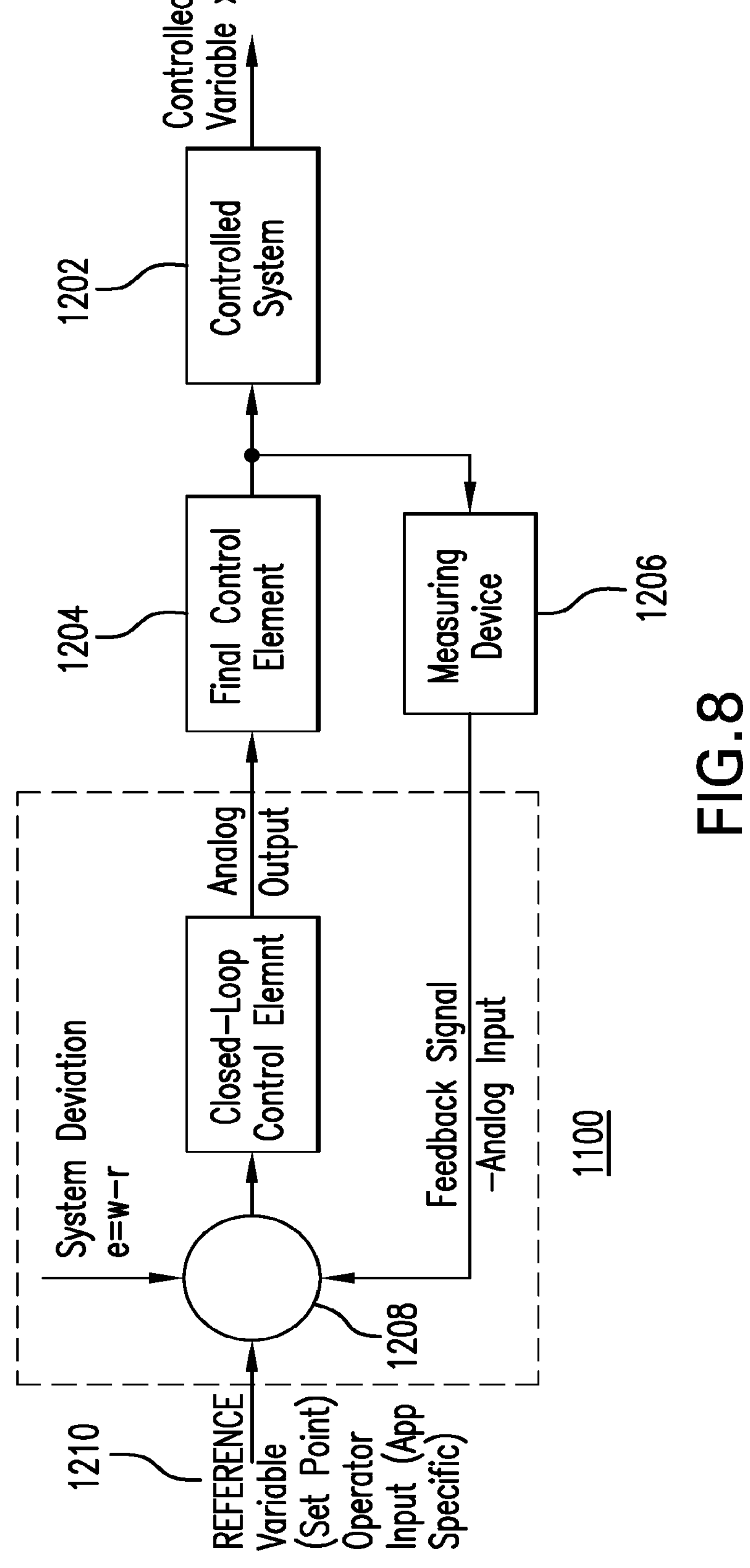
FIG. 8 illustrates an exemplary control system operation.

Additionally and as referenced throughout, one or more controller systems 1100 may be provided. As illustrated in FIG. 8, such controllers 1100 may include open loop **1190*a* and/or closed loop 1190*b* algorithms, such as may be based on the variables monitored and the controls to be executed. As illustrated in FIG. 8 and by way of example, in a closed loop control embodiment, the controlled system 1202 may ultimately be controlled by one or more elements 1204 within the system. A measuring device 1206, such as a sensor, may measure that particular element, and may provide this measurement to a comparator 1208 that may compare the measurement 1206 of the element 1204 to a reference point 1210 for that element 1204, such as given an application's specific information regarding the optimal characteristics of that element 1204. In addition, relevant readings, such as stemming from other sensors, of other elements, such as the vision system discussed throughout, may be provided to the comparator 1208 to calculate a needed adjustment. Once a deviation from acceptable characteristics is assessed by the controller 1100, a modification control signal may be output, thereby modifying the performance of the controlled element 1204, and accordingly, of the controlled system 1202**.

Figure 9:
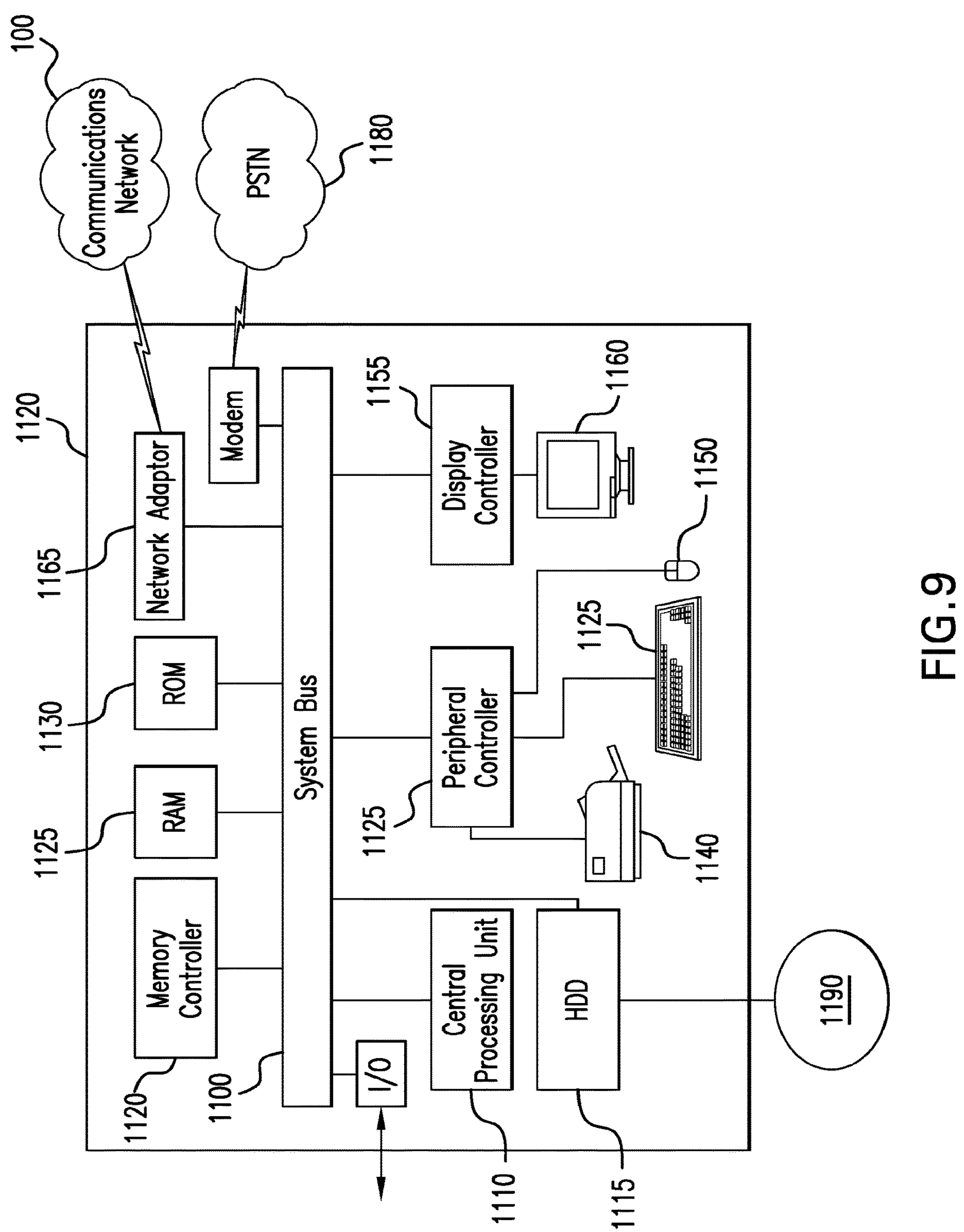
FIG. 9 illustrates an exemplary computing system.

FIG. 9 depicts an exemplary computing system 1100 for use as the controller 1100 in association with the herein described systems and methods. Computing system 1100 is capable of executing software, such as an operating system (OS) and/or the one or more control applications/algorithms 1190 discussed herein throughout.

The operation of exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software such as an operating system (OS), executable programs, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 135, which is responsible for communicating instructions from CPU 1110 to, and/or receiving data from, peripherals, such as peripherals 1140, 1145, and 1150, which may include printers, keyboards, and/or the sensors, encoders, and the like discussed herein throughout. An example of a peripheral bus is the Peripheral Component Interconnect (PCI) bus.

Display 1160, which is controlled by display controller 1155, may be used to display visual output and/or presentation generated by or at the request of computing system 1100, responsive to operation of the aforementioned computing program. Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A lamination apparatus for laminating at least one laminating film to a subject, comprising:

an upper press comprising tooling suitable to apply the laminating film;

a lower press suitable to maintain the subject to receive the laminating film, and comprising a lower vacuum chamber, an air bearing stage, a flexure diaphragm comprising a concentric flat spring, and servo-positioned tooling; and an aligner that maintains positional balance and alignment of the subject by the air bearing stage during the laminating while enabling vertical flexure of the lower press, wherein the positional balance and alignment is continuously monitored.

2. The lamination apparatus of claim 1, wherein the air bearing stage comprises four air bearings.

3. The lamination apparatus of claim 2, wherein the four air bearings are at four corners of the air bearing stage.

4. The lamination apparatus of claim 1, wherein the lower press further comprises one or more heating elements to enhance the laminating.

5. The lamination apparatus of claim 1, wherein the controller receives monitoring data from at least one vision system.

6. The lamination apparatus of claim 5, wherein the vision system comprises at least one stationary camera and a vision robot.

7. The lamination apparatus of claim 6, wherein the controller monitors by moving the vision robot to view a plurality of positions indicative of the alignment and the balance.

8. The lamination apparatus of claim 6, wherein the controller moves the vision robot to and from a safe zone outside of an area of the laminating.

9. The lamination apparatus of claim 1, wherein the air bearing is capable of re-positioning only in X-Y-theta axes.

10. The lamination apparatus of claim 1, wherein the laminating comprises at least one seal of the lower vacuum chamber.

11. The lamination apparatus of claim 10, wherein the at least one seal comprises a seal on a lower aspect of the air bearing stage.

12. The lamination apparatus of claim 11, wherein the lower aspect seal holds against the vertical flexure.

13. The lamination apparatus of claim 1, wherein the aligner further comprises a diaphragm flexure plate capable of providing variable planarity.

14. The lamination apparatus of claim 13, wherein the diaphragm flexure plate is between the lower vacuum chamber and the lower press tooling.

15. The lamination apparatus of claim 13, wherein the variable planarity is solely in the z-axis and a roll rotation.

16. The lamination apparatus of claim 13, wherein the aligner further comprises a spherical lock.

17. The lamination apparatus of claim 16, wherein the spherical lock prevents rotation of the lower tooling in a given axis.

18. The lamination apparatus of claim 1, wherein the servo positioned tooling comprises a plurality of orthogonal servo motors.

19. The lamination apparatus of claim 18, wherein the plurality of orthogonal servo motors comprises three orthogonal servo motors.

20. The lamination apparatus of claim 1, wherein the lower press has a low vertical profile.

* * * * *